UNITED STATES PATENT OFFICE.

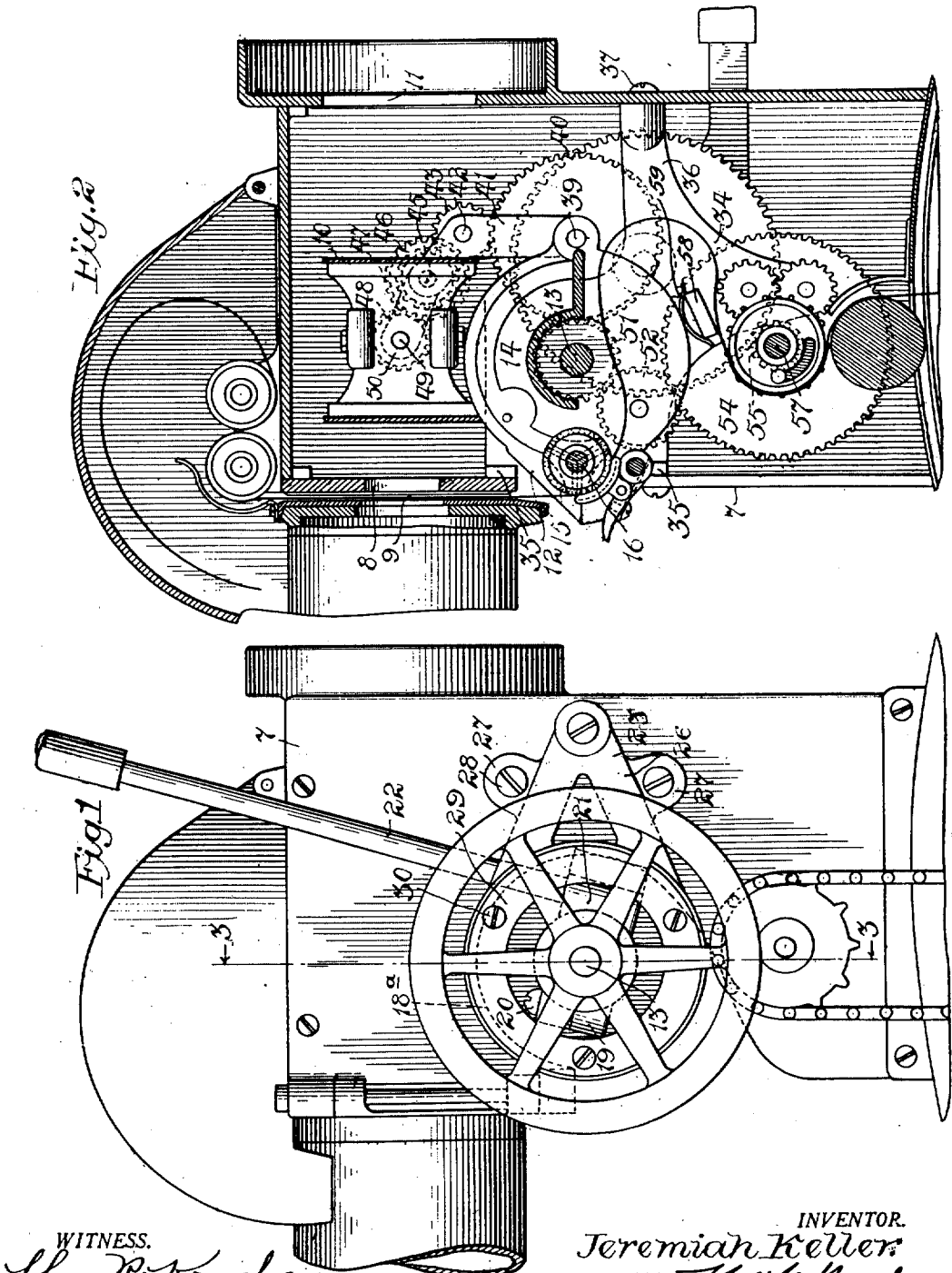

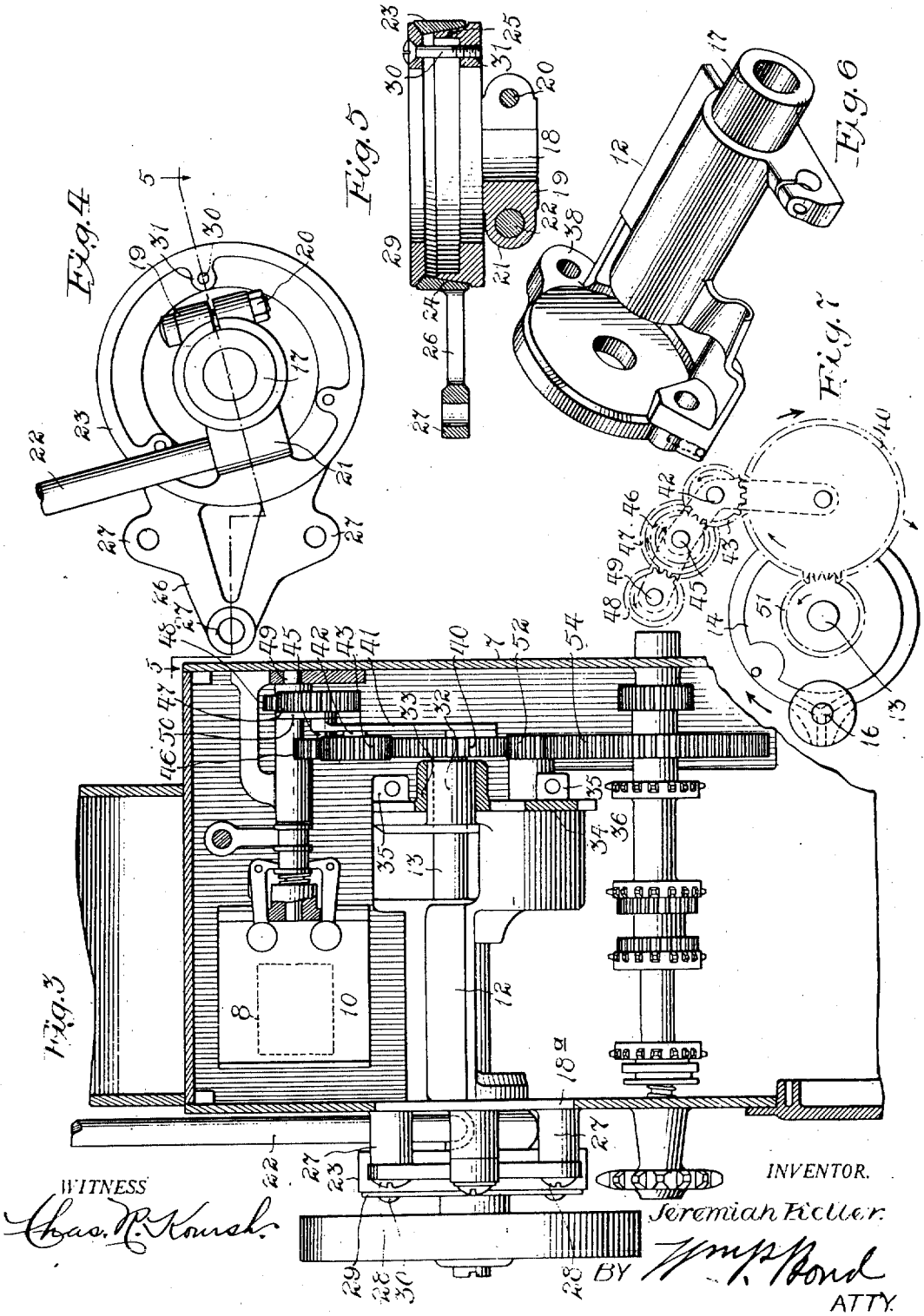

JEREMIAH KELLER, OF CHICAGO, ILLINOIS.

FRAMING DEVICE FOR MOTION-PICTURE MACHINES.

1,232,328.　　　　Specification of Letters Patent.　　Patented July 3, 1917.

Original application filed June 19, 1916. Serial No. 104,419. Divided and this application filed February 14, 1917. Serial No. 148,565.

*To all whom it may concern:*

Be it known that I, JEREMIAH KELLER, a citizen of the United States, residing at Chicago, in the county of Cook and State of Illinois, have invented certain new and useful Improvements in Framing Devices for Motion-Picture Machines, of which the following is a specification.

The present invention relates to the arrangement of certain parts, enabling a movement of the film other than the regular feeding movement, to frame or aline the projected picture with the screen, the same being a division of my application, Serial No. 104,419, filed June 19, 1916, and entitled "Intermittent gearing for motion-picture machines".

One object of the invention is to arrange a pivotal carrier for the film-feeding mechanism and to mount this carrier so that it turns about the axis of the shaft which actuates the cam member for the star-wheel.

A further object of the invention is to control the movements of the shutter during the framing operation, whereby the shutter movements will be maintained in proper timing with the movements of the star-wheel, thereby enabling the use of a small shutter blade.

A further object of the invention is to establish a train of gearing for operating the shutter, the gears of which train will be so mounted as to enable them to shift when the film is framed, whereby the shutter gear is either stopped or accelerated in its movement to adjust the timing of the shutter in correspondence to the timing of the film-feed sprocket.

A further object of the invention is to arrange certain friction devices so that the carrier for the film-feeding mechanism will not rock unless the operator manually moves a lever to perform the framing operation.

A further object of the invention is to arrange the outer wall of the casing so as to permit the removal of the carrier and the parts mounted thereon.

A further object of the invention is to apply a spring tension to the carrier so as to eliminate any knocking that may occur by reason of the wearing away of the bearings of the carrier and its consequent movement under the pounding of the star-wheel cam.

The invention further consists in the features of construction and combination of parts hereinafter described and claimed.

In the drawings:

Figure 1 is an elevation of the head of a motion-picture machine equipped with the framing appliance of the present invention;

Fig. 2, a vertical section through said head;

Fig. 3, a section on line 3—3 of Fig. 1, looking in the direction of the arrow;

Fig. 4, a detail in elevation of the friction device at one end of the carrier;

Fig. 5, a section on line 5—5 of Fig. 4;

Fig. 6, a perspective of the carrier member; and

Fig. 7, a diagrammatic view of the star-wheel, cam, and train of shutter gearing.

In the art to which the present invention relates, it oftentimes occurs that, for one reason or another, the picture when projected upon the screen will not accurately register with the confines of the screen surface, with the result that part of one picture and part of another are exposed at the same time. When this occurs, an operation known as framing must be indulged in. This operation consists in bodily moving the film with a movement other than its regular feeding movement, so that the film is shifted and brought into proper registration with the confines of the screen, whereby a single picture only is projected at one time upon the surface of the screen.

As is well known in the art, the shutter which controls the passage of light through the film is arranged to move in synchrony with the movements of the film; that is, when the film is moving, the shutter is positioned to cut the light off, and when the picture is standing still, the shutter is positioned to allow the light to pass at times through the picture and on to the screen.

One of the main features of the present invention resides in a mechanism for keeping the shutter and film-feeding sprocket in proper timed relation and at the same time allow of the use of a small shutter blade, just large enough to cover the light aperture. The use of a small shutter blade enables the obtaining of a greater number of interruptions and a better lighting of the picture, with an economy in the amount of current used. This principle is fully explained in my co-pending application Serial No. 104,419, heretofore referred to.

Every time a picture is framed, the star-wheel is moved with respect to the pin in the cam. Because of this, there will be one movement of the star-wheel which will be of different timing than the normal movement, and in order to have the shutter act to cut off the light when the star-wheel moves, the timing of the shutter must be varied in accordance with the timing of the star-wheel. If a large enough shutter blade be used to accommodate the change in timing of the star-wheel, then the principle of multi-interruptions would be destroyed. Therefore, in order to retain the benefits of a small shutter, I must use mechanical means to maintain the proper timing between the film-feeding sprocket and shutter.

Referring now to the drawings, the device is shown in connection with the head of a moving-picture machine, comprising a casing 7 of any suitable character. The casing contains the usual light aperture 8, in front of which passes the film 9; and a shutter 10 is arranged behind the aperture, adapted to cut off the light from said aperture while the picture is being moved. It is understood that the light passes through the casing from the opening 11 adjacent the lamp-house.

Mounted within the interior of the head is a carrying member 12. Said member is mounted in bearings, which cause it to rotate about the center of a shaft 13, which shaft carries and actuates the cam 14 of the star-wheel mechanism. This carrier supports and contains the film-feeding sprocket 15, which is mounted upon a shaft 16, which shaft also carries the star-wheel for intermittently operating said sprocket. This sprocket is intermittently rotated through the intermittent movement of the star-wheel by the cam. When the carrier is rocked to frame the picture, the feed-sprocket and star-wheel will move together about the center of the shaft 13.

One stub end 17 of the carrier 12 extends through an opening 18ª in a wall of the casing. This opening is sufficiently large so that the entire carrier member can be removed from the machine by a simple operation, which will be hereinafter more fully brought out. The stub 17 is entered into an opening 18 in a clamping head 19. This clamping head is better shown in Fig. 4 and is split upon one side, a tightening member 20 being employed for drawing the split portion together and effecting a clamping engagement between the head and stub 17.

The clamping member is further provided with a boss 21, into which is entered and secured an operating lever 22. The clamping member is entered into a holder 23, which is of ring-like formation and has a sloping inner face 24, with which a sloping outer face 25 on the clamping member engages. This holder member is formed with a web 26, from which extend a plurality of bosses 27, through which are entered locking members 28 that extend into the wall of the casing. Engaging the inner face of the holder member is a ring 29, through which are entered fastening members 30 that extend into lugs 31 formed on the clamping member 19. Thus, the ring and clamping member are joined together. Obviously, by advancing the fastening members 30, the clamping member can be drawn farther within the holder and a tighter engagement between the sloping faces of the clamping member and holder effected, thus increasing the friction at this point.

From the foregoing, it will be apparent that by simply removing the locking members 28, the clamping head, holder, and carrier, together with the parts secured to the carrier, can be removed for the purpose of repair, cleaning, etc., the carrier, with the parts secured thereto, passing readily through the opening 18ª in the wall of the casing.

It will be recalled that the stub end 17 of the carrying member 12 was entered in the clamping member and held therein. Therefore, by a manipulation of the hand lever 22, the clamping member will be turned within the holder, thus turning the carrying member 12 back and forth to perform the framing operation, as will be more fully hereinafter set forth. The friction engagement between the carrier and holder is such as to prevent movement of the carrier at times other than when a framing of the picture is desired.

On the opposite end of the holder to that having the stub 17 is a stub 32, which is entered into a sleeve 33 on a plate 34. This plate is formed with lugs 35, into which fastening members are entered through the wall of the casing. It is also provided with a lug or extension 36, into the end of which a fastening member 37 is entered, thus rigidly holding this plate into position within the casing and forming a support for the inner end of the carrier.

The carrier member is formed with a boss 38, through which is entered a pin 39, upon which is mounted a gear 40, also a link 41. This link is L-shaped and the middle portion is secured to a pin 42, upon which is mounted a gear 43 meshing with the gear 40. The other extreme end of the link 42 is mounted upon a pin 45. This pin 45 carries a gear 46 meshing with the gear 43, and also carries a gear 47, which meshes with a gear 48 on a pin 49 attached to the shutter; and a link 50 is mounted upon the pins 49 and 45. The gear 40 meshes with a gear 51 which is on the shaft 13 that drives the star-wheel cam. The gear 51 meshes with a gear 52 that in turn is in mesh with a gear 54 driven by a gear 55, meshing with a gear 56 on a shaft 57.

The drive of the star-wheel cam for actuating the film-feed is from the gear 56 to the gear 55, to the gear 54, and to the gear 51; and the drive of the shutter is from the gear 56 to the gear 55, to the gear 54, to the gear 51, and thence through the gear 40, gear 43, gear 46, gear 47, and on to the gear 48, so that the film-feeding mechanism and shutter are driven in synchrony, as is necessary in the operation of picture machines.

When the picture comes out of alinement with the light aperture and it is necessary to frame it, the hand lever 22 is moved, which rotates the clamping member 19, rocking the carrying member 12 about its bearings at each end. This moves the film-feeding sprocket in one direction and moves the boss 38 in the opposite direction, since these parts are arranged upon opposite sides of the axis of the holder.

By referring to Fig. 7, it will be seen that when the carrier is rocked, it will either advance or recede the star-wheel with respect to the pin of the cam. Assuming that the carrier is rocked to move the star-wheel and film-feeding sprocket in the direction of the arrow, obviously, the pin will engage the star-wheel at its next period of engagement sooner than it would have had the star-wheel remained stationary, so that this kind of movement of the star-wheel will occur sooner than the normal. In order to properly cut off the light, the shutter must cover the light aperture when the film-feed rotates, and as there will be an abnormal time of rotation of the star-wheel just after the framing, the shutter must be timed in accordance. Should the framing be done by moving the carrier in the opposite direction from the arrow, the star-wheel would be moved away from the pin, and therefore the period of movement of the star-wheel will occur later than normal. In the first instance, the action of the shutter must be accelerated so that the light will be cut off in accordance with the movement of the star-wheel sooner than normal; and in the second instance the action of the shutter must be retarded so that it will act in accordance with the delayed action of the star-wheel.

It is to be borne in mind that the gear 51 drives the shaft 13 upon which the star-wheel cam is mounted, and that this gear also drives the train of gears to the shutter, so that there is a definite timed relation between the shutter shaft and the shaft 13. This timed relation is such as to cause the shutter to operate in synchrony with the film-feeding sprocket during the normal operation of the latter; but, owing to the abnormal period of movement of the film sprocket which will occur, as explained, directly after the framing operation, the shutter shaft must be operated so that it will synchronize with the film-feeding sprocket when said sprocket has resumed its normal periods of rotation. Therefore, immediately after the framing operation, the shutter shaft must be thrown out of its normal timing with the shaft 13, and into a timing corresponding with the abnormal timing of the film-feed sprocket and star-wheel, although the gear connection between the shaft 13 and shutter shaft must be preserved in order that after said abnormal operation, the shutter may continue to be timed by the shaft 13 and hence with the film sprocket.

Now, assuming the framing to be in the direction of the arrow in Fig. 7, this, as explained, will cause a movement of the star-wheel sooner than normal. The shutter must therefore be accelerated to accommodate itself to such movement. The gear 40 is mounted on the carrier and as the carrier is rocked, said gear will move accordingly. When the framing is in the direction of the arrow in Fig. 7, the gear 40 will be bodily moved in the direction of the arrow (Fig. 7). The direction of the rotation of the shutter gears and gears 51 is indicated by the arrows on said gears in Fig. 7. When the gear 40 is moved by the carrier, as indicated by the arrow in Fig. 7, it will be bodily moved in a reverse direction to the direction of drive of the gear 51. The center of the gear 40 is the proper distance from the center of the shaft 13, so that when said gear 40 is bodily moved, as aforesaid, the effect of its traveling around the periphery of the gear 51 will be to accelerate the speed of rotation of the gear 40. The link connections to the remainder of the shutter gears is such as to allow their pivotal centers to shift in accordance with the shifting of the gear 40, so that said gears will always remain in mesh, and the increased speed imparted to the gear 40 by its movement around the gear 51, will be transmitted through the train of gears to the shutter gear 48 and hence to the shutter shaft, so that an increased speed of movement will be imparted to the shutter and it will advance in its operation in accordance with the advancement of the operation of the star-wheel, and thus the shutter and star-wheel maintained in synchrony.

Assuming that the framing is done by moving the film sprocket in the opposite direction from the arrow, Fig. 7, this will rock the carrier in a direction to move the gear 40 up, so that said gear will be bodily moved about the gear 51 in an upward direction, which will turn it about its axis in a backward direction to the direction it is driven by the gear 51. The effect will be to cause a stoppage of the rotation of the gear 40, so that it will walk about the gear 51 without rotating. This stoppage will be transmitted to the gears 43, 46 and 47, so that the latter gear will walk about the gear 48 without imparting movement thereto, and thus the action of the shutter will be arrested so that it will be timed in accordance with the delayed action of the film sprocket, and the shutter and sprocket maintained in synchrony. In this case, the link connection will permit the gears 43, 46 and 47 to have their centers shifted in accordance with the movement of the gear 40.

Care must be taken in the size of the gears of the shutter train and also in the location of their centers; otherwise, too great an accelerating movement will be given to the shutter and said shutter in place of being stopped will move backward.

Therefore, the movement of the film-feeding sprocket to adjust the film with respect to the light aperture in no wise affects the position of the shutter, and the objection to the shutter changing its position and exposing light while the film is moving, is eliminated.

It will be remembered that the carrier member 12 is the mounting for the shaft which drives the cam member of the star-wheel mechanism. Naturally, the blow resulting from the pin engaging the star-member will have its effect upon the bearings of this carrier, and in order to compensate for this, I place a lug 58 on the plate 34, and interposed between this lug and a surface of the carrier member is a spring 59, which tends to resist the downward jolting of the carrier member due to the concussion of the cam member and star-wheel, and save the wearing away of the bearings due to this pounding action. Such wearing would cause a vibration to the carrier member, which would be objectionable.

Furthermore, said spring 59 produces a friction at the inner end of the carrier, so that added resistance is obtained to the movement of the carrier, whereby it is held against movement at times other than when the framing takes place.

It is realized that changes may be made in the construction shown and described, and, therefore, it is not desired to restrict the scope of the invention beyond the terms of the appended claims.

I claim:

1. In a motion-picture machine, the combination of a rocking carrier, a film-feeding sprocket on said carrier, means for shifting said carrier to move the film-feeding sprocket and frame the picture, a friction member attached to one end of the carrier, a ring within which said friction member is frictionally positioned, means for securing the ring fixedly in position, and a lever member attached to the friction member, substantially as described.

2. In a motion-picture machine, the combination of a carrier, a film-feeding sprocket on the carrier, means for shifting said carrier to move said sprocket and frame the picture, a friction member clamped to one end of the carrier, a ring in which the friction member is mounted and within which it revolves in frictional engagement, means for securing the ring in place, and means for adjusting the degree of engagement between the ring and friction member, substantially as described.

3. In a motion-picture machine, the combination of a carrier, a film-feeding sprocket on the carrier, means for shifting said carrier to move said sprocket and frame the picture, a casing, said casing being cut out adjacent said carrier to permit a movement of the carrier and its associated parts out from the casing, and a detachable mounting for the carrier in which the carrier is frictionally held, substantially as described.

4. In a motion-picture machine, the combination of a carrier, a film-feeding sprocket on the carrier, means for shifting said carrier to move the sprocket and frame the picture, a mounting for the outer end of the carrier in which the carrier is frictionally held, a mounting for the inner end of the carrier, and a spring bearing against the carrier for absorbing shocks transmitted thereto and frictionally holding the inner end of the carrier within its mounting, substantially as described.

5. In a motion-picture machine, the combination of a carrier, a film-feeding sprocket on said carrier, means for shifting said carrier to move the film-feeding sprocket and frame the picture, a detachable friction mounting for the outer end of the carrier, and a detachable plate-like member within the casing forming a mounting for the other end of the carrier, substantially as described.

6. In a motion-picture machine, the combination of a carrier, an intermittent sprocket and star-wheel mounted on said carrier, a cam for operating the star-wheel, a cam shaft held against movement other than a rotative one about its axis, a mounting for the carrier permitting it to move about the center of movement of the cam, means for moving the carrier to bodily shift the sprocket and star-wheel and frame the picture, said movement carrying the star-wheel and sprocket concentrically about the cam whereby a momentary change in the period of movement of the star-wheel is brought about, a shutter shaft held against movement other than a rotative one about its axis, a gear on the shutter shaft, a gear on the cam shaft, a single driving connection between said gears consisting of a train of constantly meshing gears, means for mounting the gears of said train of gears enabling their axes to bodily shift when said carrier is moved, said shifting causing each of said gears to travel on the periphery of the next adjacent gear, whereby a momentary change in the speed transmitted through said train of gears is effected and a speed other than normal momentarily imparted to said shutter, whereby the movement of the shutter is synchronized to the momentary change in the period of operation of the star-wheel, substantially as described.

7. In a motion-picture machine, the combination of a carrier, an intermittent sprocket and star-wheel mounted on said carrier, a cam for operating the star-wheel, a cam shaft held against movement other than a rotative one about its axis, said carrier having a mounting permitting it to swing about the axis of said shaft, a shutter, a shutter shaft held against movement other than a rotative one about its axis, a gear on the cam shaft, a gear on the shutter shaft, a single driving connection between the cam shaft gear and shutter shaft gear consisting of a train of gears remaining constantly in mesh, the first of the gears of said train of gears being mounted on and movable with said carrier, a series of link members forming mountings for the remainder of said train of gears, the axes of all of said gears of said train bodily shifting when the carrier is moved, whereby each of the gears of said train travels on the periphery of the next adjacent gear producing a momentary change in the speed transmitted through said train of gears, and a speed other than normal momentarily imparted to said shutter, whereby the movement of the shutter is synchronized to the momentary change in the period of operation of the star-wheel, substantially as described.

8. In a motion-picture machine, the combination of a cam, a cam shaft held against movement other than a rotative one about its axis, a star-wheel operated by said cam, an intermittent sprocket operated by the star-wheel, a carrier mounted to revolve about the center of movement of said cam, said star-wheel and sprocket being mounted in said carrier and lying to one side of said cam shaft, a gear on the cam shaft, a gear on the carrier meshing with said cam shaft gear and disposed on the opposite side of said shaft from said sprocket and star-wheel, a shutter, a shutter shaft held against movement other than a rotative one about its axis, a single driving connection between said cam and shutter shafts comprising a train of gears including said carrier gear, all of said gears of said train having a constant meshing engagement, means for mounting the gears of said train to permit them to bodily shift their axes, said carrier when moved to frame the picture shifting the sprocket and star-wheel bodily in one direction concentric to the cam, and shifting the carrier gear bodily in an opposite direction and concentric to the cam shaft gear, the shifting of said sprocket and star-wheel causing a momentary change in the period of operation of the sprocket, and the shifting of said carrier gear causing a movement of each gear of said train of gears peripherally of the next adjacent gear, whereby a momentary change in the speed transmitted through said train of gears is produced, and a speed other than normal momentarily imparted to said shutter, whereby the movement of the shutter is synchronized to the momentary change in the period of operation of the star-wheel, substantially as described.

JEREMIAH KELLER.